(12) United States Patent
Ohta et al.

(10) Patent No.: US 6,562,516 B2
(45) Date of Patent: May 13, 2003

(54) NICKEL POSITIVE ELECTRODE FOR ALKALINE STORAGE BATTERIES

(75) Inventors: Kazuhiro Ohta, Sanda (JP); Yukihiro Okada, Katano (JP); Hiromu Matsuda, Kawabe-gun (JP); Yoshinori Toyoguchi, Yao (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 41 days.

(21) Appl. No.: 09/800,384

(22) Filed: Mar. 6, 2001

(65) Prior Publication Data

US 2001/0018148 A1 Aug. 30, 2001

Related U.S. Application Data

(62) Division of application No. 09/000,559, filed on Dec. 30, 1997, now Pat. No. 6,287,726.

(30) Foreign Application Priority Data

Jan. 10, 1997 (JP) .............................. 9-003005
Jan. 10, 1997 (JP) .............................. 9-003007
Jan. 14, 1997 (JP) .............................. 9-004659

(51) Int. Cl.$^7$ ................................ H01M 4/52
(52) U.S. Cl. ....................... 429/223; 429/232
(58) Field of Search ................ 429/223, 232, 429/218.2

(56) References Cited

U.S. PATENT DOCUMENTS

| | | | |
|---|---|---|---|
| 4,844,999 A | * 7/1989 | Oshitani et al. | 29/623.1 |
| 5,451,475 A | 9/1995 | Ohta et al. | |
| 5,466,543 A | * 11/1995 | Ikoma et al. | 252/182.1 |
| 5,508,121 A | 4/1996 | Sawa et al. | |
| 5,523,182 A | * 6/1996 | Ovshinsky et al. | 429/223 |
| 5,571,636 A | * 11/1996 | Ohta et al. | 429/101 |
| 5,660,952 A | 8/1997 | Yano et al. | |
| 5,804,334 A | 9/1998 | Yamamura et al. | |
| 5,861,225 A | 1/1999 | Corrigan et al. | |
| 6,007,946 A | * 12/1999 | Yano et al. | 429/206 |
| 6,136,473 A | * 10/2000 | Furukawa et al. | 420/900 |

FOREIGN PATENT DOCUMENTS

| | | |
|---|---|---|
| EP | 0 634 804 A1 | 1/1995 |
| EP | 0 727 835 A1 | 8/1996 |
| JP | 01-200555 A | 8/1989 |
| JP | 03-145058 | 6/1991 |
| JP | 05-028992 A | 2/1993 |
| JP | 07-045281 | 2/1995 |
| JP | 07-272722 | 10/1995 |
| JP | 07-320735 | 12/1995 |
| JP | 09-180717 | 7/1997 |
| JP | 10-012238 A | 1/1998 |

OTHER PUBLICATIONS

Cordoba De Torresi, S. I.: The Effect of Manganese Addition on Nickel Hydroxide Electrodes with Emphasis on its Electrochromic Properties:, *Electrochimica Acta* 40:9, 1101–1107 (1995).

* cited by examiner

*Primary Examiner*—Carol Chaney
(74) *Attorney, Agent, or Firm*—Akin, Gump, Strauss, Hauer & Feld, L.L.P.

(57) ABSTRACT

Disclosed is a nickel positive electrode for alkaline storage batteries with superb utilization of nickel hydroxide in an atmosphere from room temperature to high temperature. The positive electrode comprises a nickel hydroxide particle or a nickel hydroxide particle with one or more elements other than Ni incorporated therein, a coating layer which comprises a compound of cobalt having a mean valence over 2 and which coats the nickel hydroxide particle, and a compound of at least one element selected from the group consisting of Ca, Sr, Ba, Cu, Ag, Cd, Y, Yb, Ce, Sm, Gd and Er.

13 Claims, No Drawings

NICKEL POSITIVE ELECTRODE FOR ALKALINE STORAGE BATTERIES

This application is a divisional of U.S. application Ser. No. 09/000,559, filed Dec. 30, 1997, now U.S. Pat. No. 6,287,726.

BACKGROUND OF THE INVENTION

The present invention relates to an improvement of nickel positive electrode for alkaline storage batteries and a method for producing the same.

Recently, there is an increasing demand for secondary batteries having a high energy density with the development of compact and light-weight portable appliances with high added-values. It has also been desired to develop a novel secondary battery with a high energy density as a power source for electric vehicles. In order to serve the growing need for such secondary batteries, high capacity batteries using a conventional sintered nickel electrode have been developed in the technical field of nickel-cadmium battery. In parallel to this, batteries with a high energy density using a foamed metal type nickel positive electrode having a high capacity by 30 to 60%, and even nickel-metal hydride storage batteries using a hydrogen storage alloy for the negative electrode have also been under development. The latter is not less than two times higher in capacity than the nickel-cadmium battery using the sintered type nickel positive electrode.

In the above-listed high capacity alkaline storage batteries, a nickel hydroxide powder is filled in high density into a sintered nickel porous substrate, a three-dimensional foamed nickel porous substrate with a porosity of as high as not less than 90%, or a nickel fiber porous substrate in order to improve the energy density of the positive electrode. This increases the energy density of the positive electrode to 450 to 500 mAh/cm$^3$ with the currently used sintered type nickel positive electrode, and to even 550 to 650 mAh/cm$^3$ with the foamed metal type nickel positive electrode, compared to the value of 400 to 450 mAh/cm$^3$ with the conventional sintered type nickel positive electrode.

However, positive electrodes prepared by filling a nickel hydroxide active material in high density into a sintered nickel porous substrate, a foamed nickel porous substrate, or a nickel fiber porous substrate have a drawback that their energy density decreases at high temperature, although it is high around room temperature. This may be because under the charging condition of high temperature atmosphere, oxygen evolution reaction is liable to occur simultaneously with the charging-associated reaction where nickel hydroxide is oxidized to nickel oxyhydroxide. This means that in high temperature environment, the oxygen evolution potential decreases at the positive electrode, resulting in insufficient oxidation of nickel hydroxide to nickel oxyhydroxide, thereby decreasing the utilization of nickel hydroxide.

In order to solve this drawback, there is a suggested method to incorporate at least one selected from the compounds of yttrium, indium, antimony, barium, calcium and beryllium into the positive electrode (see, Japanese Laid-Open Patent Publication Hei 5-28992). Any of these compounds incorporated into the positive electrode is adsorbed onto the surface of the nickel hydroxide active material and acts to improve the utilization of the nickel hydroxide active material during charging in a high temperature atmosphere. However, there still exists a demand for further increased utilization in high temperature atmosphere.

On the other hand, there is another proposal to improve the utilization of nickel hydroxide by a method of forming cobalt hydroxide on the surface of nickel hydroxide active material and then heating it in the presence of oxygen and an alkaline aqueous solution to form a highly conductive compound of cobalt with a high valence over 2 (higher than 2 valent) on the surface of the nickel hydroxide active material (Japanese Laid-Open Patent Publication Hei 1-200555). Although this method is effective for improving the utilization of the nickel hydroxide active material around room temperature, the effect on the utilization in a high temperature atmosphere is not large. Now, those two references are incorporated herein by reference.

BRIEF SUMMARY OF THE INVENTION

From the above, the object of the present invention is to provide a nickel positive electrode for alkaline storage batteries exerting an exceptional utilization of nickel hydroxide active material in an environment from room temperature to high temperature.

The present invention provides a nickel positive electrode for alkaline storage batteries comprising particles of a nickel hydroxide material, a coating layer comprising a compound of cobalt with a mean valence over 2 and coating the particles, and a compound of at least one metallic element selected from the group consisting of Ca, Sr, Ba, Cu, Ag, Cd, Y, Yb, Ce, Sm, Gd and Er.

Here, as the compound of at least one metallic element, one selected from the group consisting of Ca(OH)$_2$, CaO, CaF$_2$, CaS, CaSO$_4$, CaSi$_2$O$_5$, calcium oxalate CaC$_2$O$_4$, CaWO$_4$, SrCO$_3$, Sr(OH)$_2$, BaO, Cu$_2$O, Ag$_2$O, CdO, Y$_2$O$_3$, Y(OH)$_3$, Y$_2$(CO$_3$)$_3$, Yb$_2$O$_3$, Yb(OH)$_3$, CeO$_2$, Sm$_2$O$_3$, Gd$_2$O$_3$ and Er$_2$O$_3$ is preferred.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

The present invention is directed to a nickel positive electrode which includes an active material prepared by forming a coating layer of a compound of cobalt with a mean valence over 2 on the surface of nickel hydroxide particles and which further contains a compound of at least one metallic element selected from the group consisting of Ca, Sr, Ba, Cu, Ag, Cd, Y, Yb, Ce, Sm, Gd and Er.

The active material used here having a coating layer of a compound of cobalt with a mean valence over 2 can be produced by the method of, for example, heating a nickel hydroxide powder provided thereon with a coating layer of cobalt hydroxide in the presence of both oxygen and an alkaline aqueous solution.

In a preferred mode of the present invention, the nickel positive electrode for alkaline storage batteries contains a mixture of the active material mentioned immediately before and a compound of at least one metallic element selected from the group consisting of Ca, Sr, Ba, Cu, Ag, Cd, Y, Yb, Ce, Sm, Gd and Er.

In another preferred mode of the present invention, the compound of at least one metallic element selected from the group consisting of Ca, Sr, Ba, Cu, Ag, Cd, Y, Yb, Ce, Sm, Gd and Er is contained in the coating layer formed on the active material.

The above-mentioned nickel hydroxide can be produced by the steps of adding an aqueous solution containing a cobalt ion and an ion of at least one metallic element selected from the group consisting of Ca, Sr, Ba, Cu, Ag, Cd, Y, Yb, Ce, Sm, Gd and Er to an aqueous dispersion of a nickel hydroxide particle, under a pH condition adjusted with an alkaline aqueous solution, to obtain an active material particle in which the nickel hydroxide particle is coated with a coating layer composed of a compound of cobalt and a compound of at least one element, and heating the active material particle thus obtained in the presence of both oxygen and an alkaline aqueous solution. Here, the alkaline aqueous solution may contain ammonia.

In still another preferred mode of the present invention, the nickel positive electrode for alkaline storage batteries comprises a particle composed of aggregated crystals of a nickel hydroxide material with a coating layer of a compound of cobalt having a mean valence over 2, the particle containing inside and on the surface thereof a compound of at least one metallic element selected from the group consisting of Ca, Sr, Ba, Cu, Ag, Cd, Y, Yb, Ce, Sm, Gd and Er.

The nickel positive electrode can be produced by heating a nickel hydroxide particle with a coating layer of a compound of cobalt having a mean valence over 2, together with a compound of at least one metallic element selected from the group consisting of Ca, Sr, Ba, Cu, Ag, Cd, Y, Yb, Ce, Sm, Gd and Er, in the presence of both oxygen and an alkaline aqueous solution thereby to obtain an active material.

The nickel positive electrode in accordance with the present invention is completed by supporting the above-mentioned active material or active material mixture on a substrate as a supporting member.

The active material or active material mixture may, if occasion demands, further contain cobalt or a cobalt compound.

A preferred ratio of the compound of at least one element ranges from 0.1 to 5 parts by weight per 100 parts by weight of the nickel hydroxide.

The cobalt compound is preferably contained in the coating layer in a range of 1 to 20 parts by weight per 100 parts by weight of the nickel hydroxide.

The nickel hydroxide particle employed in the present invention preferably comprises a solid solution nickel hydroxide material with one or more elements other than Ni incorporated therein.

In addition, if the compound of at least one element is contained in the coating layer, then the compound is preferably contained in a range of 0.05 to 3 parts by weight per 10 parts by weight of the cobalt compound.

Preferably, the concentration of the alkaline aqueous solution for alkali treatment and the heating temperature during production of the active material or active material mixture are 15 to 60 wt % and 50 to 150° C., respectively.

Since the coating layer of a compound of cobalt with a valence over 2 which coats the surface of the nickel hydroxide particle has high conductivity, an improving effect on the utilization of active material can be obtained. In other words, the efficiency of charge-associated reaction where nickel hydroxide is oxidized to nickel oxyhydroxide as shown in the formula (1) below can be enhanced satisfactorily.

The positive electrode in accordance with the present invention contains a compound of at least one element selected from the group consisting of Ca, Sr, Ba, Cu, Ag, Cd, Y, Yb, Ce, Sm, Gd and Er. These compounds effectively elevate the oxygen evolution potential representing a competitive reaction during charging in a high temperature atmosphere as shown in the formula (2) below.

The synergistic effect of the above-mentioned two effects produces further increased utilization of the positive electrode in a high temperature atmosphere.

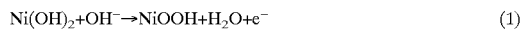

$$Ni(OH)_2 + OH^- \rightarrow NiOOH + H_2O + e^- \qquad (1)$$

$$2OH^- \rightarrow 1/2 O_2 + H_2O + 2e^- \qquad (2)$$

In this way, a nickel positive electrode which exerts excellent active material utilization and charge efficiency in an atmosphere in a wide range from room temperature to high temperature can be obtained.

In the following, the present invention will be described more specifically by way of examples.

In the below-mentioned examples, although a nickel hydroxide particle which is incorporated therein with Zn, as a mother particle, by 3 wt % of the total metallic elements, any other nickel hydroxide materials with Zn, Co, Mg, Cd, or the like incorporated therein, or pure nickel hydroxide may also be used similarly.

EXAMPLE 1

A 1 mole/L cobalt sulfate aqueous solution and a 25 wt % sodium hydroxide aqueous solution were added to an aqueous dispersion of a powder of solid solution nickel hydroxide incorporated therein with Zn by 3 wt % of the total metallic elements and pH was adjusted to 10, while agitating the dispersion. In this way, a coating layer of a cobalt compound composed mainly of cobalt hydroxide on the surface of the nickel hydroxide particle was obtained. In the coating layer for coating the nickel hydroxide powder, the cobalt compound was contained by 10 parts by weight per 100 parts by weight of the Zn-incorporated nickel hydroxide.

Then, electric conductivity of the obtained nickel hydroxide powder coated with the cobalt hydroxide was measured, which showed a value of 0.01 $\mu$S/cm or less.

Subsequently, the nickel hydroxide powder provided thereon with the cobalt compound coating layer was added with a 40 wt % sodium hydroxide aqueous solution to the extent to humidify the powder and mixed well. Then, the mixture was heated at 120° C. for 1 hour in air, washed with water and dried. Cobalt of the cobalt compound in the coating layer of the resultant active material had a valence of 2.9, as determined by a redox titration technique using sodium thiosulfate. The electric conductivity measured in the active material thus produced was 2.2 mS/cm. These results confirmed drastically improved electric conductivity of the active material by the above heat treatment.

Then, 110 parts by weight of the nickel hydroxide active material powder having the cobalt compound coating layer were mixed with 1 part by weight of a calcium hydroxide powder and the mixture was agitated well, which was then added with water to produce a paste. The paste was filled into a foamed nickel substrate as a supporting member with a thickness of 1.6 mm, a porosity of 95%, and a surface density of 600 g/m² and dried, which was then pressure-molded and immersed in an aqueous dispersion of a fluorocarbon resin powder. Then, the substrate was dried and cut to a size of 90×70 mm, which gave a nickel positive electrode A. Here, various nickel positive electrodes B to S as shown in Table 1 were also produced in the above-mentioned manner, using various compounds as the compound of at least one element, in place of the calcium hydroxide powder, in the same quantity.

TABLE 1

| Positive electrode | Compound of a metallic element contained in the positive electrode (part by weight/100 parts by weight of nickel hydroxide) | |
|---|---|---|
| A | Ca(OH)$_2$ | (1) |
| B | CaO | (1) |
| C | CaF$_2$ | (1) |
| D | CaS | (1) |
| E | CaSO$_4$ | (1) |
| F | CaSi$_2$O$_5$ | (1) |
| G | CaC$_2$O$_4$ | (1) |
| H | CaWO$_4$ | (1) |
| I | Sr(OH)$_2$ | (1) |
| J | BaO | (1) |
| K | Cu$_2$O | (1) |
| L | Ag$_2$O | (1) |
| M | CdO | (1) |
| N | Y$_2$O$_3$ | (1) |
| O | Yb$_2$O$_3$ | (1) |
| P | CeO$_2$ | (1) |
| Q | Sm$_2$O$_3$ | (1) |
| R | Gd$_2$O$_3$ | (1) |
| S | Er$_2$O$_3$ | (1) |

Separately, various positive electrodes A1 to A5 as listed in Table 2, and AA1 to AA5 as listed in Table 3 were also produced, respectively, using various nickel hydroxide active material mixtures prepared by fixing the ratio of the cobalt compound coating layer to the nickel hydroxide at 10:100 parts by weight and varying the ratio of the above-mentioned calcium hydroxide powder from 0.05 to 10 parts by weight, and those prepared by fixing the ratio of the above-mentioned calcium hydroxide powder to the nickel hydroxide at 1:100 parts by weight and varying the ratio of the cobalt compound coating layer from 0.5 to 25 parts by weight.

TABLE 2

| Positive electrode | Amount of calcium hydroxide (part by weight/100 parts by weight of nickel hydroxide) |
|---|---|
| A1 | 0.05 |
| A2 | 0.1 |
| A3 | 1 |
| A4 | 5 |
| A5 | 10 |

TABLE 3

| Positive electrode | Amount of cobalt compound (part by weight/100 parts by weight of nickel hydroxide) |
|---|---|
| AA1 | 0.5 |
| AA2 | 1 |
| AA3 | 10 |
| AA4 | 20 |
| AA5 | 25 |

Comparative Example 1

For comparison, another nickel positive electrode T was produced in the same manner as in Example 1; except for the exclusion of the calcium hydroxide powder from the active material mixture.

Comparative Example 2

Here, 10 parts by weight of a cobalt hydroxide powder, 1 part by weight of a calcium hydroxide powder and water were added to 100 parts by weight of a powder of solid solution nickel hydroxide incorporated therein with Zn by 3 wt % of the total metallic elements, and the mixture was agitated well to form a paste. The paste was filled into a foamed nickel substrate as a supporting member with a thickness of 1.6 mm, a porosity of 95%, and a surface density of 600 g/m$^2$ and dried, which was then pressure-molded and immersed in an aqueous dispersion of a fluorocarbon resin powder. Then, the substrate was dried and cut to a size of 90×70 mm, which gave a nickel positive electrode U.

Comparative Example 3

Similarly, a 1 mole/L cobalt sulfate aqueous solution and a 25 wt % sodium hydroxide aqueous solution were added to an aqueous dispersion of a powder of solid solution nickel hydroxide incorporated therein with Zn by 3 wt % of the total metallic elements and pH was adjusted to 10, while agitating the dispersion. In this way, a coating layer of a cobalt compound on the surface of the nickel hydroxide particle in a ratio of 10 parts by weight per 100 parts by weight of nickel hydroxide was obtained. The resultant nickel hydroxide active material powder was mixed with a yttrium oxide powder in a weight ratio of 100:1 and the mixture was agitated well, which gave an active material mixture. The resultant mixture was added with water to form a paste. The paste was filled into a foamed nickel substrate as a supporting member with a thickness of 1.6 mm, a porosity of 95%, and a surface density of 600 g/m$^2$ and dried, which was then pressure-molded and immersed in an aqueous dispersion of a fluorocarbon resin powder. Then, the substrate was dried and cut to a size of 90×70 mm, which gave a nickel positive electrode V.

Flooded cell type batteries including an electrolyte of a potassium hydroxide aqueous solution with a specific gravity of 1.30 were produced by sandwiching one sheet of each of the nickel positive electrodes A to V between two sheets of known hydrogen storage alloy negative electrode having a larger theoretical capacity than the positive electrode.

The batteries thus produced were tested by charging for 15 hours at a 10-hour rate as determined from the theoretical capacity of the respective positive electrodes as reference and, after a 3-hour rest, discharging at 20° C. at a 5-hour rate until the interterminal voltage dropped to 1 V. In testing, charging was performed at varied temperature of 20° C., 45° C. or 55° C., but discharging was done at a fixed temperature of 20° C.

Tables 4, 5 and 6 show the ratios of the discharge capacity after charging at 45° C. and 55° C. to the discharge capacity after charging at 20° C. and the utilization ratios of discharge after charging at 20° C. (percentages calculated by defining the utilizations of the respective reference positive electrodes listed in the tables as 100) in the nickel positive electrodes A to V, A1 to A5, and AA1 to AA5, respectively. The utilization ratios were calculated from the below-mentioned equation. The standard utilizations shown in Tables 4, 5 and 6 were derived from the positive electrodes A, A3 and AA3, respectively.

Utilization ratio=(discharge capacity density per unit weight of positive electrode)/(discharge capacity density per unit weight of reference positive electrode)×100

TABLE 4

| Positive electrode | Discharge capacity ratio (45° C./20° C.) | Discharge capacity ratio (55° C./20° C.) | Utilization ratio (20° C.) |
|---|---|---|---|
| A | 83 | 72 | 100 |
| B | 82 | 72 | 99 |
| C | 85 | 74 | 100 |
| D | 83 | 72 | 100 |
| E | 82 | 71 | 100 |
| F | 81 | 70 | 99 |
| G | 82 | 72 | 100 |
| H | 81 | 71 | 100 |
| I | 80 | 70 | 100 |
| J | 81 | 71 | 99 |
| K | 80 | 70 | 100 |
| L | 82 | 71 | 100 |
| M | 83 | 72 | 99 |
| N | 87 | 76 | 100 |
| O | 87 | 75 | 100 |
| P | 84 | 73 | 100 |
| Q | 83 | 72 | 99 |
| R | 84 | 73 | 100 |
| S | 84 | 73 | 100 |
| T | 74 | 64 | 100 |
| U | 79 | 68 | 91 |
| V | 78 | 68 | 92 |

TABLE 5

| Positive electrode | Discharge capacity ratio (45° C./20° C.) | Discharge capacity ratio (55° C./20° C.) | Utilization ratio (20° C.) |
|---|---|---|---|
| A1 | 73 | 62 | 100 |
| A2 | 80 | 70 | 100 |
| A3 | 85 | 75 | 100 |
| A4 | 85 | 74 | 99 |
| A5 | 84 | 72 | 95 |

TABLE 6

| Positive electrode | Discharge capacity ratio (45° C./20° C.) | Discharge capacity ratio (55° C./20° C.) | Utilization ratio (20° C.) |
|---|---|---|---|
| AA1 | 70 | 59 | 75 |
| AA2 | 81 | 70 | 94 |
| AA3 | 87 | 76 | 100 |
| AA4 | 87 | 75 | 94 |
| AA5 | 88 | 74 | 88 |

As is apparent from Tables 1 and 4, the batteries using the positive electrodes A to S in accordance with the present invention are high in charge efficiency at high temperatures compared to the batteries using the positive electrode T of Comparative Example 1, the positive electrode U of Comparative Example 2 or the positive electrode V of Comparative Example 3. It is also seen that the utilizations of the former are better than those of the respective positive electrodes U and V of Comparative Examples 2 and 3.

From the above, it is understood that the positive electrodes in accordance with the present invention have an effect of elevating the oxygen evolution potential by the presence of the compound of at least one element selected from the group consisting of Ca, Sr, Ba, Cu, Ag, Cd, Y, Yb, Ce, Sm, Gd and Er, and another effect of improving the active material utilization by the presence of the coating layer of a compound of cobalt with a valence over 2, and that their synergistic effect contributes to further improvement of the positive electrode utilization even in a high temperature atmosphere.

In addition, from Table 5, it is shown that in the positive electrodes using the active materials including the calcium hydroxide as the compound of at least one metallic element in a range of 0.1 to 5 parts by weight per 100 parts by weight of the nickel hydroxide, the charge efficiency at high temperatures is excellent.

It is also understood from Table 6 that the positive electrodes using the active materials including the cobalt compound coating layer in a range of 1 to 20 parts by weight per 100 parts by weight of nickel hydroxide show an exceptional active material utilization and high temperature charge efficiency.

The tendency as shown in Tables 5 and 6 obtained by the calcium compound was also confirmed with the above-listed compounds of at least one element selected from the group consisting of Sr, Ba, Cu, Ag, Cd, Y, Yb, Ce, Sm, Gd and Er.

In the foregoing examples, although a Zn-incorporated nickel hydroxide material was used, other nickel hydroxide materials incorporated with a metallic element, such as Co, Mg, Cd, or the like, other than Ni, or nickel hydroxide materials with no incorporation of any metallic element other than Ni may also be used. The primary aim of incorporation of Zn, Mg, or Cd is to inhibit the formation of γ-NiOOH during charging, and the primary aim of incorporation of Co is to increase the utilization. With either nickel hydroxide material, the effects by the present invention which were described previously can be obtained similarly.

EXAMPLE 2

In this example, a 1 mole/L cobalt sulfate aqueous solution and a 25 wt % sodium hydroxide aqueous solution were added to an aqueous dispersion of a powder of solid solution nickel hydroxide incorporated therein with Zn by 3 wt % of the total metallic elements and pH was adjusted to 10, while agitating the dispersion. In this way, a coating layer containing a cobalt compound by 10 parts by weight per 100 parts by weight of the Zn-incorporated nickel hydroxide was obtained.

Then, 110 parts by weight of the resultant nickel hydroxide active material powder having the cobalt compound coating layer were mixed with 1 part by weight of a calcium fluoride powder and the mixture was added with a 40 wt % sodium hydroxide aqueous solution to the extent to humidify the powder and mixed well, which was then heated at 120° C. for 1 hour in air. Subsequently, the mixture was washed with water and dried, which gave an active material mixture.

At that time, various active material mixtures 1 to 12 listed in Table 7 were also prepared in the same manner as described above, using various compounds as the compound of at least one element, in place of the calcium fluoride powder, in the same quantity.

TABLE 7

| Active material | Compound of a metalic element contained in the active material mixture (part by weight/100 parts by weight of nickel hydroxide) | |
|---|---|---|
| 1 | $CaF_2$ | (1) |
| 2 | $Sr(OH)_2$ | (1) |
| 3 | BaO | (1) |
| 4 | $Cu_2O$ | (1) |
| 5 | $Ag_2O$ | (1) |

TABLE 7-continued

| Active material | Compound of a metalic element contained in the active material mixture (part by weight/100 parts by weight of nickel hydroxide) | |
|---|---|---|
| 6 | CdO | (1) |
| 7 | $Y_2O_3$ | (1) |
| 8 | $Yb_2O_3$ | (1) |
| 9 | $CeO_2$ | (1) |
| 10 | $Sm_2O_3$ | (1) |
| 11 | $Gd_2O_3$ | (1) |
| 12 | $Er_2O_3$ | (1) |

Separately, other active materials 13 to 17 listed in Table 8, and 18 to 22 listed in Table 9 were prepared respectively, by fixing the ratio of the cobalt compound coating layer to the nickel hydroxide at 10:100 parts by weight and varying the ratio of the above-mentioned calcium fluoride powder from 0.05 to 10 parts by weight, or inversely by fixing the ratio of the calcium fluoride powder to the nickel hydroxide at 1:100 parts by weight and varying the ratio of the cobalt compound coating layer from 0.5 to 25 parts by weight.

TABLE 8

| Active material | Amount of calcium fluoride (part by weight/100 parts by weight of nickel hydroxide) |
|---|---|
| 13 | 0.05 |
| 14 | 0.1 |
| 15 | 1 |
| 16 | 5 |
| 17 | 10 |

TABLE 9

| Active material | Amount of cobalt compound coating layer (part by weight/100 parts by weight of nickel hydroxide) |
|---|---|
| 18 | 0.5 |
| 19 | 1 |
| 20 | 10 |
| 21 | 20 |
| 22 | 25 |

Subsequently, water was added to each of the active material mixtures 1 to 22 thus prepared to form a paste. The paste was then filled into a foamed nickel substrate as a supporting member with a thickness of 1.6 mm, a porosity of 95%, and a surface density of 600 g/m$^2$ and dried, which was then pressure-molded. Then, the substrate was immersed in an aqueous dispersion of a fluorocarbon resin powder, dried and cut to a size of 90×70 mm. In this way, nickel positive electrodes 1A to 22A were produced.

Comparative Example 4

For comparison, another nickel positive electrode 23A was produced in the same manner as in Example 2, except for the exclusion of the calcium fluoride powder from the active material mixture.

Comparative Example 5

Here, 10 parts by weight of a cobalt hydroxide powder and 1 part by weight of a calcium fluoride powder were added to 100 parts by weight of a powder of solid solution nickel hydroxide incorporated therein with Zn by 3 wt % of the total metallic elements, which was then mixed with water to form a paste. The paste was filled into a foamed nickel substrate as a supporting member with a thickness of 1.6 mm, a porosity of 95%, and a surface density of 600 g/m$^2$ and dried, which was then pressure-molded. Then, the substrate was immersed in an aqueous dispersion of a fluorocarbon resin powder, dried and cut to a size of 90×70 mm, which gave a nickel positive electrode 24A.

Flooded cell type batteries including an electrolyte of a potassium hydroxide aqueous solution with a specific gravity of 1.30 were produced by sandwiching one sheet of each of the nickel positive electrodes of Example 2, Comparative Example 4 and Comparative Example 5 between two sheets of known hydrogen storage alloy negative electrode having a larger theoretical capacity than the positive electrode.

The batteries thus produced were tested by charging for 15 hours at a 10-hour rate as determined from the theoretical capacity of the respective positive electrodes as reference and, after a 3-hour rest, discharging at 20° C. at a 5-hour rate until the interterminal voltage dropped to 1 V. In testing, charging was performed at varied temperature of 20° C., 45° C. or 55° C., but discharging was done at a fixed temperature of 20° C.

Tables 10, 11 and 12 show the ratios of the discharge capacity after charging at 45° C. and 55° C. to the discharge capacity after charging at 20° C. and the utilization ratios during 20° C. charging in the nickel positive electrodes 1A to 12A, 23A, 24A, 13A to 17A, and 18A to 22A, respectively. In Tables 10, 11 and 12, the positive electrodes 1A, 15A and 20A represent the respective reference positive electrodes.

TABLE 10

| Positive electrode | Discharge capacity ratio (45° C./20° C.) | Discharge capacity ratio (55° C./20° C.) | Utilization ratio (20° C.) |
|---|---|---|---|
| 1A | 87 | 76 | 100 |
| 2A | 81 | 72 | 99 |
| 3A | 80 | 71 | 100 |
| 4A | 83 | 72 | 100 |
| 5A | 80 | 71 | 100 |
| 6A | 81 | 72 | 99 |
| 7A | 83 | 74 | 100 |
| 8A | 83 | 74 | 100 |
| 9A | 82 | 73 | 100 |
| 10A | 83 | 73 | 99 |
| 11A | 82 | 72 | 100 |
| 12A | 83 | 73 | 100 |
| 23A | 72 | 62 | 99 |
| 24A | 78 | 68 | 91 |

TABLE 11

| Positive electrode | Discharge capacity ratio (45° C./20° C.) | Discharge capacity ratio (55° C./20° C.) | Utilization ratio (20° C.) |
|---|---|---|---|
| 13A | 71 | 61 | 100 |
| 14A | 80 | 71 | 100 |
| 15A | 86 | 74 | 100 |
| 16A | 86 | 74 | 99 |
| 17A | 85 | 73 | 96 |

TABLE 12

| Positive electrode | Discharge capacity ratio (45° C./20° C.) | Discharge capacity ratio (55° C./20° C.) | Utilization ratio (20° C.) |
| --- | --- | --- | --- |
| 18A | 69 | 58 | 73 |
| 19A | 81 | 71 | 93 |
| 20A | 85 | 73 | 100 |
| 21A | 85 | 73 | 94 |
| 22A | 88 | 74 | 87 |

As is apparent from Tables 7 and 10, the batteries using the positive electrodes 1A to 12A in accordance with the present invention are superior in both active material utilization and high temperature charge efficiency to the batteries using the positive electrodes which do not contain the compound of at least one metallic element and those using the positive electrode which do no contain the active material having the cobalt compound coating layer in accordance with the present invention. It is also seen that as the compound of at least one metallic element contained in the active material mixture, any compounds of one element selected from Sr, Ba, Cu, Ag, Cd, Y, Yb, Ce, Sm, Gd and Er are also effective like the calcium compound.

From Table 11, it is seen that when calcium fluoride as the compound of at least one metallic element is incorporated in a range of 0.1 to 5 parts by weight per 100 parts by weight of nickel hydroxide, high charging efficiency at high temperatures can be obtained.

From Table 12, it is also found that when the coating layer of the compound of cobalt with a valence over 2 is contained in a range of 1 to 20 parts by weight per 100 parts by weight of nickel hydroxide, a high active material utilization and excellent charging efficiency at high temperatures can be obtained at the same time.

The tendency as shown in Tables 11 and 12 obtained by the calcium compound was also confirmed with the above-listed compounds of at least one element selected from the group consisting of Sr, Ba, Cu, Ag, Cd, Y, Yb, Ce, Sm, Gd and Er.

EXAMPLE 3

In this example, a 1.5 mole/L nickel sulfate aqueous solution containing a small amount of zinc sulfate, a 15 mole/L ammonia aqueous solution and a 25 wt % sodium hydroxide aqueous solution were mixed together to deposit a powder of solid solution nickel hydroxide with a mean particle diameter of 10 ∞m incorporated therein with Zn by 3 wt % of the total metallic elements. Then, the nickel hydroxide powder thus deposited was washed with water and dried, which was used as a nickel hydroxide mother particle.

Subsequently, a mixture of a cobalt sulfate aqueous solution and a calcium nitrate aqueous solution was added to an aqueous dispersion of the nickel hydroxide mother particle drop by drop by adjusting the pH to 10 with a sodium hydroxide aqueous solution. In this way, an active material particle coated with a composite compound of Co and Ca was obtained. In this active material particle, the coating layer is contained in the form of either a mixture of cobalt hydroxide and calcium hydroxide or Ca-incorporated cobalt hydroxide.

Then, various other active material particles were prepared similarly, using, for the coating layer, nitrate aqueous solutions or sulfate aqueous solutions, each containing different metallic element, in place of calcium nitrate aqueous solution. At that time, the kind and content of elements contained in the coating layer were adjusted by varying the mixing ratio of the nitrate or sulfate aqueous solution containing different metallic element to the cobalt sulfate aqueous solution. The amount of coating layer was adjusted by varying the dropping amount of the mixture aqueous solution onto the aqueous dispersion of the mother particle.

Each of the active material particles thus obtained was impregnated with a 40% sodium hydroxide aqueous solution to the extent to humidify the particle and mixed well, which was then dried and heated at 120° C. for 1 hour in air. Then, the particle was washed with water and dried, which gave active materials a1 to a13.

In this way, nickel active materials a1 to a13 as shown in Table 13 below were prepared.

TABLE 13

| Active material | Constituent element of a compound of the coating layer (part by weight/100 parts by weight of nickel hydroxide) |
| --- | --- |
| a1 | Co(10):— |
| a2 | Co(10):Ca(0.5) |
| a3 | Co(10):Sr(0.5) |
| a4 | Co(10):Ba(0.5) |
| a5 | Co(10):Cu(0.5) |
| a6 | Co(10):Ag(0.5) |
| a7 | Co(10):Cd(0.5) |
| a8 | Co(10):Y (0.5) |
| a9 | Co(10):Yb(0.5) |
| a10 | Co(10):Ce(0.5) |
| a11 | Co(10):Sm(0.5) |
| a12 | Co(10):Gd(0.5) |
| a13 | Co(10):Er(0.5) |

EXAMPLE 4

In this example, active materials b1 to b5 as listed in Table 14 and c1 to c5 as listed in Table 15 were prepared as follows. First, active material particles were prepared by fixing the ratio of the cobalt compound to the calcium compound contained in the coating layer which were used in the above Example 3 to 10:0.5 parts by weight and varying the ratio of the coating layer to the mother particle from 0.5:100 to 25:100 parts by weight, or by fixing the ratio of the cobalt compound to the mother particle at 10:100 parts by weight and varying the ratio of the calcium compound from 0.02 to 5 parts by weight. Then, each of these active material particles thus prepared were impregnated with a 40 wt % sodium hydroxide aqueous solution to the extent to humidify the particle and mixed well, which was then heated at 120° C. for 1 hour in air, washed with water and dried.

TABLE 14

| Active material | Amount of the coating layer (part by weight/100 parts by weight of nickel hydroxide) |
| --- | --- |
| b1 | 0.5 |
| b2 | 1 |
| b3 | 10 |
| b4 | 20 |
| b5 | 25 |

TABLE 15

| Active material | Amount of the calcium compound (part by weight/100 parts by weight of nickel hydroxide) |
|---|---|
| c1 | 0.02 |
| c2 | 0.05 |
| c3 | 0.5 |
| c4 | 3 |
| c5 | 5 |

Water was added to each of the active material powders prepared in Example 3 and Example 4 and mixed well to form a paste. The paste was then filled into a foamed nickel substrate as a supporting member with a thickness of 1.6 mm, a porosity of 95%, and a surface density of 600 g/m² and dried, which was then pressure-molded. Then, the substrate was immersed in an aqueous dispersion of a fluorocarbon resin powder, dried and cut to a size of 90×70 mm. In this way, nickel positive electrodes aa1 to aa13, bb1 to bb5 and cc1 to cc5 were produced.

Comparative Example 6

Here, 0.5 parts by weight of a $CaF_2$ powder, 10 parts by weight of cobalt hydroxide and water were added to 100 parts by weight of a nickel hydroxide mother particle prepared in the same manner as in Example 3, and the mixture was mixed well to form a paste. The paste was then filled into a foamed nickel substrate as a supporting member with a thickness of 1.6 mm, a porosity of 95%, and a surface density of 600 g/m² and dried, which was then pressure-molded. Then, the substrate was immersed in an aqueous dispersion of a fluorocarbon resin powder, dried and cut to a size of 90×70 mm. In this way, a nickel positive electrode yy was produced.

Comparative Example 7

First, a nickel hydroxide mother particle prepared in the same manner as in Example 3 was dispersed in water. Then, a cobalt sulfate aqueous solution was added to the dispersion drop by drop by adjusting the pH to 10 with a sodium hydroxide aqueous solution. In this way, an active material particle z coated with a cobalt compound was obtained. In this active material, the cobalt compound coating layer occupied 10 parts by weight per 100 parts by weight of nickel hydroxide.

Then, 0.5 parts by weight of a $CaF_2$ powder and water were added to 110 parts by weight of the active material z, and the mixture was mixed well to form a paste. The paste was then filled into a foamed nickel substrate as a supporting member with a thickness of 1.6 mm, a porosity of 95%, and a surface density of 600 g/m² and dried, which was then pressure-molded. Then, the substrate was immersed in an aqueous dispersion of a fluorocarbon resin powder, dried and cut to a size of 90×70 mm. In this way, a nickel positive electrode zz was produced.

Flooded cell type batteries including an electrolyte of a potassium hydroxide aqueous solution with a specific gravity of 1.30 were produced by sandwiching one sheet of each of the nickel positive electrodes of Example 3, Example 4, Comparative Example 6 and Comparative Example 7 between two sheets of known hydrogen storage alloy negative electrode having a larger theoretical capacity than the positive electrode.

The batteries thus produced were tested by charging for 15 hours at a 10-hour rate as determined from the theoretical capacity of the respective positive electrodes as reference and, after a 3-hour rest, discharging at 20° C. at a 5-hour rate until the interterminal voltage dropped to 1 V. In testing, charging was performed at varied temperature of 20° C., 45° C. or 55° C., but discharging was done at a fixed temperature of 20° C.

Tables 16, 17 and 18, respectively, show the ratios of the discharge capacity after charging at 45° C. and 55° C. to the discharge capacity after charging at 20° C. and the utilization ratios during 20° C. charging in the nickel positive electrodes aa1 to aa13, yy, and zz, bb1 to bb5 and cc1 to cc5. In Tables 16, 17 and 18, the positive electrodes aa2, bb3 and cc3 represent the respective reference positive electrode.

TABLE 16

| Positive electrode | Discharge capacity ratio (45° C./20° C.) | Discharge capacity ratio (55° C./20° C.) | Utilization ratio (20° C.) |
|---|---|---|---|
| yy | 79 | 68 | 90 |
| zz | 78 | 68 | 91 |
| aa1 | 74 | 64 | 101 |
| aa2 | 87 | 76 | 100 |
| aa3 | 86 | 74 | 99 |
| aa4 | 84 | 72 | 100 |
| aa5 | 85 | 72 | 100 |
| aa6 | 84 | 72 | 100 |
| aa7 | 85 | 76 | 99 |
| aa8 | 88 | 79 | 101 |
| aa9 | 89 | 79 | 100 |
| aa10 | 88 | 78 | 101 |
| aa11 | 87 | 77 | 100 |
| aa12 | 86 | 75 | 100 |
| aa13 | 89 | 78 | 99 |

TABLE 17

| Positive electrode | Discharge capacity ratio (45° C./20° C.) | Discharge capacity ratio (55° C./20° C.) | Utilization ratio (20° C.) |
|---|---|---|---|
| bb1 | 70 | 59 | 75 |
| bb2 | 81 | 70 | 94 |
| bb3 | 87 | 76 | 100 |
| bb4 | 87 | 75 | 94 |
| bb5 | 88 | 75 | 89 |

TABLE 18

| Positive electrode | Discharge capacity ratio (45° C./20° C.) | Discharge capacity ratio (55° C./20° C.) | Utilization ratio (20° C.) |
|---|---|---|---|
| cc1 | 72 | 62 | 100 |
| cc2 | 80 | 70 | 100 |
| cc3 | 87 | 76 | 100 |
| cc4 | 87 | 75 | 99 |
| cc5 | 86 | 74 | 98 |

As is apparent from Tables 13 and 16, the battery using the positive electrode aa2 in accordance with the present invention is superior in utilization and high temperature charging efficiency to the battery using the conventional positive electrode yy and zz in which the ratio of the cobalt compound to the calcium compound was equivalent. From the results of the positive electrodes aa3 to aa13, it is understood that any positive electrode using an active material containing a coating layer composed of a compound of at least one element selected from the group consisting of Sr, Ba, Cu, Ag, Cd, Y, Yb, Ce, Sm, Gd, and Er, and a cobalt compound are also excellent.

On the other hand, the battery including the positive electrode aa1 using an active material of which coating layer contains only the cobalt compound is low in charging efficiency for elevating the oxygen evolution potnetial, has been omitted from this active material mixture.

Tables 14 and 17 illustrate the relationship between the ratio of the coating layer and the active material utilization when the coating layer was composed of deposits of 2 metallic components of a cobalt compound and a calcium compound at a fixed ratio ob 10:0.5 parts by weight and the ratio of the coating layer to the mother particle was varied. As is apparent from the tables, when the ratio of the coating layer to the mother particle was below 1:100 or over 20:100 parts by weight, a drastic drop occurred in the utilization. This may be explained as follows: Low ratios below 1 part by weight led to deficiency of the compounds of the coating layer, particularly the cobalt compound, which in turn caused failure of formation of a good conductive network. On the other hand, when the ratio is over 20 parts by weight, there occurs a relative reduction of the content of nickel hydroxide in the active material mixture, and the capacity is decreased too great overwhelming the effect of the coating layer on the improvement of conductivity.

The tendency as shown in Table 17 obtained by the calcium compound was also confirmed with the above-listed compounds of at least one element selected from the group consisting of Sr, Ba, Cu, Ag, Cd, Y, Yb, Ce, Sm, Gd and Er.

From the above results, it is found that the preferable ratios of the coating layer on the mother particle are in a range of 1:100 to 20:100 parts by weight.

Tables 15 and 18 illustrate the relationship between the ratio of the calcium compound, high temperature charging efficiency, and active material utilization in the batteries using the positive electrodes cc1 to cc5, which were prepared by using a combination of a cobalt compound and a calcium compound for the coating layer, fixing the ratio of the cobalt compound to the mother particle (10:100 parts by weight) and varying the ratio of the calcium compound to the mother particle. As is clearly seen from the tables, when the ratio of the calcium compound to the cobalt compound in the coating layer is below 0.05:10 parts by weight, the high temperature charging efficiency is impaired markedly. This may be because too small amounts of calcium compound in the deposits prevented the coating layer from expressing its full effect of elevating the oxygen evolution potential.

When the ratio of the calcium compound to the cobalt compound exceeds 3:10 parts by weight, the electric capacity per unit weight of active material decreases. This may be explained that reduced cobalt compound density on the surface of the active material due to increased ratio of calcium compound caused a reduction of capacity per unit weight.

Similarly, the tendency as shown in Table 18 obtained by the calcium compound was also confirmed with the above-listed compounds of at least one element selected from the group consisting of Sr, Ba, Cu, Ag, Cd, Y, Yb, Ce, Sm, Gd and Er.

From these results, it is found that the preferred ratios of the compound of the metallic element to the cobalt compound in the composite coating layer composed of deposits of a cobalt compound and a compound of at least one metallic element are in a range of 0.05:10 to 3:10 parts by weight.

In the foregoing examples, although a Zn-incorporated nickel hydroxide particle by 3 wt % of total metallic elements was used as the mother particle, similar effects may also be obtained from any nickel hydroxide material incorporated therein with any other arbitrary element, such as Zn, Co, Mg, Cd, or the like.

Finally, in the production of positive electrodes, further addition of adequate amounts of cobalt or a cobalt compound to the active material in accordance with the present invention will ensure further improved utilization of active material.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A nickel positive electrode for alkaline storage batteries comprising particles of a nickel hydroxide material, a coating layer which comprises a compound of cobalt with a mean valence over 2 and which coats said particles, and a compound of at least one metallic element selected from the group consisting of Cd, Yb, Ce, Sm, Gd and Er, wherein said particles with said coating layer have an electric conductivity of at least 2.2 mS/cm.

2. The nickel positive electrode for alkaline storage batteries in accordance with claim 1, wherein said compound of said at least one metallic element is selected from the group consisting of CdO, $Yb_2O_3$, $Yb(OH)_3$, $CeO_2$, $Sm_2O_3$, $Gd_2O_3$ and $Er_2O_3$.

3. The nickel positive electrode for alkaline storage batteries in accordance with claim 2, wherein a ratio of said compound of said at least one metallic element ranges from 0.1 to 5 parts by weight per 100 parts by weight of said nickel hydroxide material.

4. The nickel positive electrode for alkaline storage batteries in accordance with claim 1, wherein a ratio of said compound of said at least one metallic element in said coating later is 0.05 to 3 parts by weight per 10 parts by weight of said cobalt compound.

5. The nickel positive electrode for alkaline storage batteries in accordance with claim 1, wherein a ratio of said cobalt compound in said coating layer is 1 to 20 parts by weight per 100 parts by weight of said nickel hydroxide material.

6. A nickel positive electrode for alkaline storage batteries comprising particles of aggregated crystals of a nickel hydroxide material provided with a coating layer of a compound of cobalt with a mean valence over 2, said particles containing inside and on the surface thereof a compound of at least one metallic element selected from the group consisting of Cd, Yb, Ce, Sm, Gd and Er.

7. The nickel positive electrode for alkaline storage batteries in accordance with claim 6, wherein said compound of at least one metallic element is one selected from the group consisting of CdO, $Yb_2O_3$, $Yb(OH)_3$, $CeO_2$, $Sm_2O_3$, $Gd_2O_3$ and $Er_2O_3$.

8. The nickel positive electrode for alkaline storage batteries in accordance with claim 7, wherein a ratio of said compound of said at least one metallic element ranges from 0.1 to 5 parts by weight per 100 parts by weight of said nickel hydroxide material.

9. The nickel positive electrode for alkaline storage batteries in accordance with claim 6, wherein a ratio of said cobalt compound in said coating layer is 1 to 20 parts by weight per 100 parts by weight of said nickel hydroxide material.

10. A nickel positive electrode for alkaline storage batteries comprising particles of a nickel hydroxide material, a coating layer which comprises a compound of cobalt with a mean valence over 2 and which coats said particles, and a compound of at least one metallic element selected from the group consisting of Y and Yb.

11. A nickel positive electrode for alkaline storage batteries comprising particles of a nickel hydroxide material, a coating layer which comprises a compound of cobalt with a mean valence over 2 and which coats said particles, and a compound of Yb.

12. A nickel positive electrode for alkaline storage batteries comprising particles of a nickel hydroxide material and a coating layer which comprises a compound of cobalt with a mean valence over 2 and which coats said particles, said coating layer comprising a compound of at least one metallic element selected from the group consisting of Cd, Yb, Ce, Sm, Gd, and Er.

13. The nickel positive electrode for alkaline storage batteries in accordance with claim 12, wherein said compound of said at least one metallic element is selected from the group consisting of CdO, $Yb_2O_3$, $Yb(OH)_3$, $CeO_2$, $Sm_2O_3$, $Gd_2O_3$, and $Er_2O_3$.

* * * * *